2,928,547

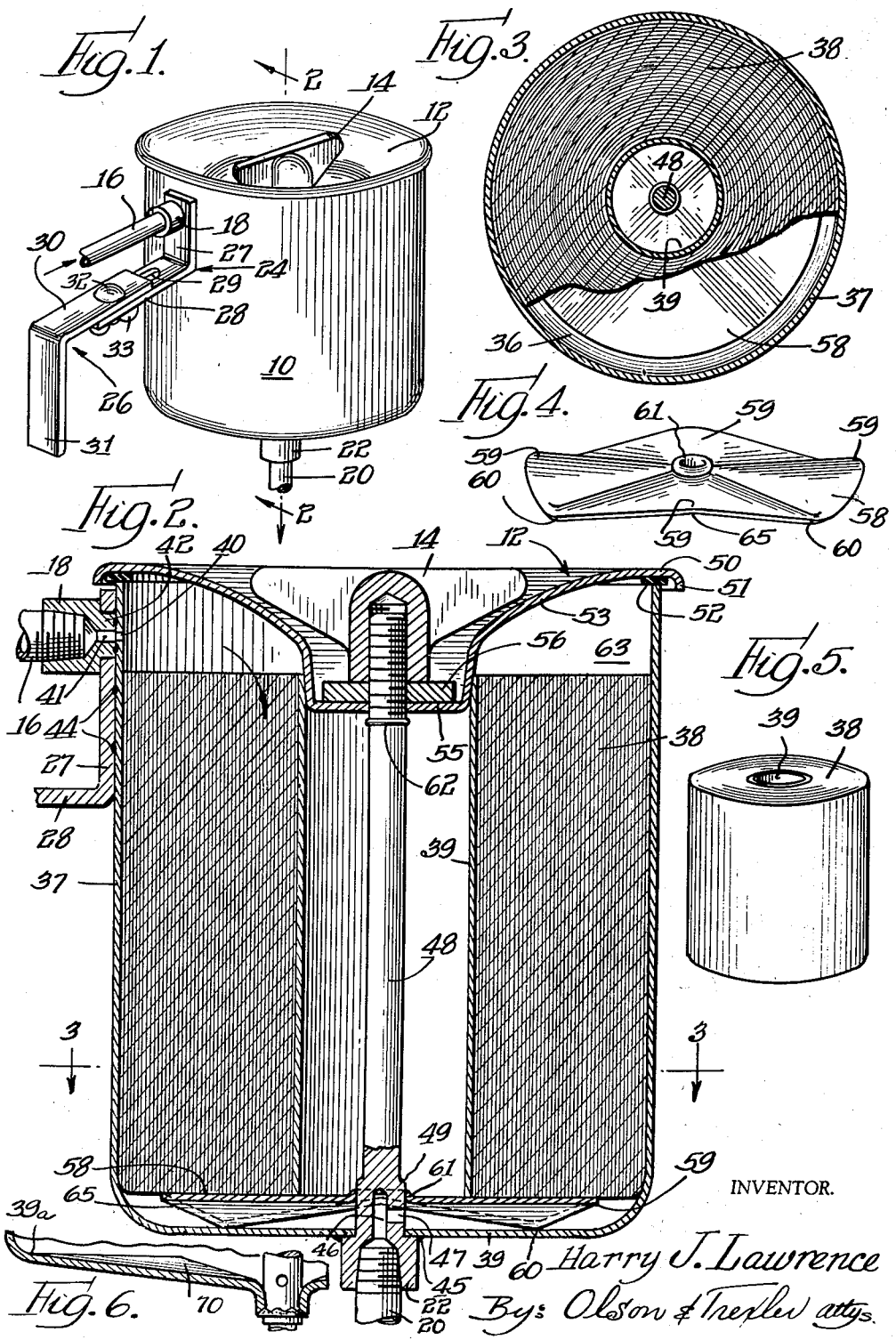

OIL FILTER

Harry J. Lawrence, Milwaukee, Wis., assignor to Perc C. Sorenson and Lee Jewell, both of Wauwatosa, Wis.

Application December 28, 1956, Serial No. 631,136

10 Claims. (Cl. 210—451)

The present invention relates to new and useful improvements in a filter container and filter assembly, and more particularly to such improvements in oil filters adapted for use in circulating oil systems of internal combustion engines, such as commonly employed in automobile engines and the like.

In general, the invention contemplates the provision of an oil filter assembly including a novel form of container for receiving a readily replaceable filter unit therein. More particularly, however, the invention is concerned with the provision of a filter assembly wherein the container is adapted to receive and support a filter unit in the form of a commercially available roll of tissue, such as toilet tissue or a roll of tissue paper or cellulose toweling having the proper absorbent qualities.

With the above in mind, one of the principal objects of the present invention is to provide a filter container which is of extremely simple and inexpensive construction in that the principal parts thereof may be sheet metal stampings that can be inexpensively formed by stamping and punching operations.

Another object of the invention is to provide a filter container which is constructed and arranged to support the filter unit in position such that there is substantially free ingress of oil to the container and egress of oil therefrom.

A further object of the invention is to provide a filter container which includes a removable filter unit support to thus facilitate cleaning of the container when a filter unit is replaced.

A still further object of the invention is to provide a filter assembly wherein the core of the filter unit is effectively sealed against the passage of oil therethrough.

A still further object of the invention is to provide a filter assembly having improved oil flow characteristics and having simplified means for mounting the same in variously designed installations.

The invention still further aims to provide a filter assembly which is of extremely simple construction and which is easily manipulated to permit removal of a used filter unit, cleaning of the filter container and replacement with a new filter unit.

The above and other objects of the invention will in part be obvious and will be hereinafter more fully pointed out.

In the accompanying drawing:

Fig. 1 is a perspective view showing the filter assembly as it would appear in a typical installation;

Fig. 2 is an enlarged sectional view taken substantially along the line 2—2 of Fig. 1;

Fig. 3 is a reduced section taken along the line 3—3 of Fig. 2;

Fig. 4 is a perspective view of the removable support for the filter unit;

Fig. 5 is a perspective view showing a typical commercially available filter unit such as a roll of tissue; and Fig. 6 illustrates a modified embodiment.

Referring more in detail to the accompanying drawing, and particularly to Fig. 1 at this time, the filter assembly is illustrated as including a container 10 having a closing cover 12 secured thereto by a wind nut 14 or the like, as will be hereinafter explained. The oil inlet line 16 is connected to a fitting 18 mounted on the container wall and the oil outlet line 20 is connected to a fitting 22 mounted on the bottom wall of the container.

The filter assembly is mounted in a particular environment by bracket members 24, 26. The bracket member 24 includes a vertical arm 27 and a horizontal arm 28, the horizontal arm 28 being provided with a longitudinal slot 29 therethrough. The bracket member 26 includes a horizontal arm 30 and a vertical arm 31. The horizontal arm 30 of the bhacket 26 has fixed thereto a screw member 32 which is adapted to pass through the slot 29 and to be held in adjusted position by a wing nut 33 or the like. With this type of double bracket assembly, the filter can be mounted in various positions, depending upon the particular design of the automobile or other installation where it is to be used. Thus, by loosening the wing nut 33, the bracket 26 may be adjusted longitudinally with respect to the bracket 24 and, similarly, bracket 26 may be rotated about the screw axis for angular adjustment with respect to the bracket 24. Likewise, the bracket 26 may be reversed with respect to the bracket 24 so that the arm 31 of the bracket 26 will project upwardly. It will be appreciated, therefore, that this bracket assembly is one which can be adapted to properly mount the filter assembly in various installations having different space requirements or the like.

Referring to Fig. 2, the container 10 is shown as including a bottom wall 36 and a side wall 37, illustrated as being cylindrical. The container can thus be formed in a stamping or drawing operation to provide its cuplike configuration which is adapted to snugly receive a roll of tissue or the like, as shown in Fig. 5, which includes multiple windings of the tissue 38 and a centrally disposed hollow core 39 usually of cardboard or the like.

Near the upper end of the side wall 37 of the container, there is provided an opening 40 which communicates with the bore 41 of the fitting 18 to which the hollow inlet line 16 is attached. This fitting 18 includes a reduced portion 42 which is snugly fitted in a coresponding opening in the bracket arm 27 and is brazed, welded or otherwise secured as at 43, to the container wall. Likewise, the bracket arm 27 is also brazed, welded or otherwise secured as at 44 to the container wall.

The bottom wall 36 of the container is centrally apertured to receive the fitting 22 which is brazed, welded or otherwise secured, as at 45, thereto. This fitting 22 includes a short longitudinal passage 46 and one or more radial passages 47 communicating therewith and forming the outlet for the filtered oil which will then pass to the outlet line 20.

The fitting 22 includes a relatively long stem 48 which is of a cross section slightly reduced with respect to the portion 49 in which the bores or passages 46, 47 are formed. The opposite or free end of the stem 48 is threaded to threadedly receive the wing nut 14.

The cover 12 includes an outer substantially cylindrical portion 50 having a depending outer flange 51 and carrying on its inner surface a gasket 52 of Thiokol or other artificial rubber, or other material which is impervious to oil and resistant to deterioration by contact therewith. The center portion of the cover curves or tapers downwardly as at 53, to merge into a slightly conical portion 54 which extends downwardly and inwardly to the center end 55 of the cover. The center portion 55 of the cover is apertured to permit the passage of the stem 48 therethrough but is sealed by a gasket 56 also of Thiokol or the like and against which the hub of the wing nut 14 is pressed when the parts are tightened together.

For supporting the bottom of the roll of tissue within the filter container, there is provided a washer member 58 of the type shown in Fig. 4. This washer member is undulated around its outer edge portion to provide spaced high points 59 radiating from the center and alternately spaced low points 60. The high surfaces 59 constitute substantially straight edges which project under a portion of the tissue roll and serve to support the same above the bottom wall of the container, the alternate low points 60 engaging the bottom wall of the container for this purpose. The washer 58 has a central aperture defined by an annular flange portion 61 which is of an internal diameter to provide a relatively tight press fit with the external surface of the portion 49 of the fitting 22, thus to resist upward flow of oil into the space within the core 39 of the tissue roll.

After the supporting washer 58 is fitted into the bottom of the container in the manner described above, the roll of tissue is fitted within the container to rest upon the high surfaces 59 of the washer 58. Then the cover 12 is placed on the container with the threaded end of the stem projecting through the bottom central portion 55 of the cover in order to threadedly receive the wing nut 14. There is thus provided between the top of the tissue roll and the cover a relatively large annular space 63 for the reception of oil to be filtered from the inlet line 16. The wing nut is tightened in order to compress the sealing washers 52, 56 and in doing so the conical portion 54 will effect a progressively tighter wedging fit with the inner surface of the core 39 of the tissue roll, thus to effectively seal the interior of the core 39 against passage of oil thereto from the annular chamber 63. The downwardly dished portion 53 of the cover provides an external recess within which the wing nut 14 is housed so that it will not project above the top of the cover when in tightened position. The tightening of the wing nut may be varied to some extent to increase or decrease the compactness of the upper surface of the tissue roll but in order to prevent undue tightening and resultant deformation of the cover and a too tight compacting of the roll, the stem 48 may be provided with an outward stop flange 62 to prevent depression of the center portion 55 of the cover therebelow.

In operation of the filter assembly, oil to be filtered will enter the unencumbered space 63 from the inlet line 16. It will be seen that there is thus free flow of oil into this chamber above the filter medium. Oil will then pass through the rolled layers of tissue which act as a filter and the filtered oil will then pass along the bottom wall of the container and flow to the outlet line 20 through the stem passages 47, 46. It will be noted that the high and low points or surfaces 59, 60 of the washer 58 merge with one another along downwardly inclined surfaces so that the oil issuing from the filter roll will tend to flow down the inclined surfaces to the troughs, so to speak, which in turn incline outwardly to the low points 60 of the washer. Thus, the washer tends to cause the flow of filtered oil away from the central portion thereof and to prevent its building up within the tissue roll core 39. The washer 58 is of a diameter less than the diameter of the bottom of the container so that oil dropping from the washer at the low points will then flow beneath the washer and gain access to the outlet port 47. Thus it will be seen that there are provided relatively wide channel spaces 65 beneath the high surfaces 59 of the washer so that the filtered oil is free to pass along these passages to the central outlet. It is to be further noted that the center flanged portion of the washer is substantially the high point thereof and is press-fitted on to the stem portion 49 above the passage or passages 47.

When it is desired to replace the tissue roll, the cover 12 is removed from the container and the spent roll also removed and discarded. It is often desirable to clean the interior surface of the container, particularly at the outlet and to also clean the tissue roll supporting washer 58. Some slight force is required to lift the washer 58 by reason of the press-fit of the flange 61 with the stem portion 49 but as soon as this friction is overcome, the reduced stem 48 permits rapid removal of the washer so that it and the bottom of the container may be quickly cleaned. The washer 58 is then "threaded" on to the stem 48 and again press-fitted over the lower portion 49 of the stem and a new tissue roll is inserted and the cover reapplied in the manner pointed out above.

From the foregoing description, it will be readily appreciated that the present invention provides an extremely simple and inexpensive filter assembly and one in which the ingress and egress of oil is greatly facilitated in that there is substantially no obstruction to the oil flowing into the filter and substantially no obstruction is afforded by the supporting washer 58 to the egress of filtered oil therefrom. The washer 58 affords ample support for the tissue roll but its undulating configuration also provides for the free flow of filtered oil along its surfaces so as to gain access to the bottom of the container along which the oil is free to flow to the egress passage 47. The cover, with its conical center portion, provides a tight wedging seal between the inner surface of the roll core 39 and the oil chamber 63 above the tissue roll. The container parts, except for the fittings and wing nut, are conveniently formed of stamped or drawn sheet metal parts, thus rendering the manufacture and assembly a relatively inexpensive operation. The mounting of the inlet fitting 18 in association with the bracket 24 constitutes an effective mounting and at the same time the bracket arm 27 forms a convenient reinforcing support for the fitting 18. The outlet fitting 22 with its integral stem 48 serves the double function of providing the oil outlet as well as the securing and sealing means for the cover.

Fig. 6 illustrates a modified embodiment. In some instances it is desirable that the support means, which comprises the washer 58 in the embodiment of the invention previously described, be embodied directly as a part of the casing structure, instead of being provided as a separate washer member. Such an arrangement is illustrated in Fig. 6, wherein it will be seen that the lower portion of the casing, as indicated at 39a is provided with an undulating formation, as indicated at 70, having essentially the same form and characteristics as the washer 58 previously described. This formation may be imparted to the sheet metal casing, as it is stamped and otherwise formed.

While certain preferred forms of the invention have been shown for purposes of illustration, it is to be clearly understood that various changes in the details of construction and arrangement of parts may be made without departing from the scope and spirit of the invention as set forth in the appended claims.

I claim:

1. An oil filter comprising a substantially cup-shaped container of readily formable sheet material, a tissue roll including a tubular core serving as the filter unit replaceably fitted in the container, means supporting the roll above the bottom of the container to provide for the flow of filtered oil therebelow, a cover of readily formable sheet material for the open end of the container and having a depending central portion with an imperforate side wall fitting within the adjacent end of the core to seal the same against passage of oil thereto and providing, with the container wall and adjacent end of the roll, an annular oil receiving chamber above said tissue roll, oil inlet passage means above said tissue roll and leading directly to said annular chamber from which the oil passes downwardly through the tissue roll, and oil outlet passage means through the bottom of the container and in alignment with said core of the tissue roll.

2. An oil filter according to claim 1 wherein said formable sheet material is sheet metal.

3. An oil filter as claimed in claim 1, wherein the oil inlet passage means includes a conduit fitting secured to the side wall of the container above the top of the tissue roll to direct oil laterally into the oil receiving chamber.

4. An oil filter as claimed in claim 1, wherein the oil outlet passage means includes a conduit fitting centrally secured to the bottom of the container, and wherein the said conduit fitting includes an elongated solid stem projecting through the core and central portion of the cover and threaded at the upper end thereof for receiving a fastener to secure the cover in closed position with the fastener housed within the depending portion of the cover, whereby removal of said fastener permits easy access to said tissue roll for replacement thereof.

5. An oil filter as claimed in claim 1, wherein the support means for the roll comprises a removable plate member bent to provide lower portions engaging the bottom of the container and upper portions in supporting engagement with the roll and with the intermediate, downwardly inclined portions providing oil flow passages.

6. An oil filter as claimed in claim 1, wherein a stem member projects centrally upwardly from the bottom of the container, and wherein the support means for the roll comprises a removable undulated washer-like member having a central opening through which the stem extends.

7. An oil filter as claimed in claim 6, wherein the stem is generally of lesser diameter than the central opening in the washer to facilitate application and removal thereof but is provided with an increased diameter portion adjacent the bottom of the container operating to provide a pressed friction fit with the washer material around the central opening therein.

8. An oil filter as claimed in claim 1, wherein said means supporting the roll above the bottom of the container comprises a plurality of undulations formed in the container bottom wall.

9. In an oil filter having a filter element in the form of a tissue roll wrapped on a tubular core, the provision of a container of readily formable sheet material for receiving the tissue roll, a sheet material cover for the container, said cover having a central depressed portion terminating in a conical portion providing a wedging seal with the interior of the adjacent end of the core, said cover defining an annular chamber between a wall of said container and said central depressed portion, a stem member projecting from the bottom of the container through said depressed portion of the cover, and a wing nut cooperating with the stem to secure the cover on the container in sealed relation therewith, said wing nut being substantially housed within the depression provided by said depressed portion of the cover.

10. In an oil filter as claimed in claim 9, wherein there is provided at the bottom of the container spacing plate means supporting the tissue roll above the bottom of the container.

References Cited in the file of this patent

UNITED STATES PATENTS

| | | |
|---|---|---|
| 1,302,731 | Trekell | May 6, 1919 |
| 1,753,809 | Short | Apr. 8, 1930 |
| 2,547,857 | Cook | Apr. 3, 1951 |
| 2,597,217 | Zenick | May 20, 1952 |
| 2,661,846 | Lash | Dec. 8, 1953 |
| 2,750,048 | Hilbish | June 12, 1956 |